United States Patent [19]

Lasswell et al.

[11] 3,926,934
[45] Dec. 16, 1975

[54] POLYETHYLENE POWDERS

[75] Inventors: Joseph A. Lasswell, Orange, Tex.;
Francis E. Brown, Shawnee, Kans.

[73] Assignee: Gulf Research & Development Company, Pittsburgh, Pa.

[22] Filed: Aug. 9, 1971

[21] Appl. No.: 170,326

Related U.S. Application Data

[63] Continuation-in-part of Ser. No. 5,141, Jan. 22, 1970, abandoned.

[52] U.S. Cl.. 260/94.9 A; 260/94.9 GD; 260/878 R
[51] Int. Cl.².. C08F 2/16; C08F 6/00; C08F 10/02; C08F 110/02
[58] Field of Search.... 260/94.9 A, 94.9 GD, 878 R

[56] References Cited
UNITED STATES PATENTS 2,728,755   12/1955   Weisemann.................... 260/94.9 A
3,380,945   4/1968    Deex et al..................... 260/94.9 A

OTHER PUBLICATIONS

Schildknecht, C. E., *Polymer Processes*, Interscience, New York (1956), pp. 69–71, 78–81, and 105–109.

*Primary Examiner*—Alan Holler

[57] ABSTRACT

Polyethylene powders containing adsorbed water are prepared by the high-pressure polymerization of ethylene employing a water-soluble initiator, a controlled concentration of water, a dispersing agent selected from the group consisting of polyvinyl alcohol and polyvinyl pyrrolidone, and rapidly venting the polymerization zone or the polymerization effluent mixture withdrawn from the polymerization zone.

5 Claims, No Drawings

POLYETHYLENE POWDERS

CROSS-REFERENCE TO RELATED APPLICATIONS

This application is a continuation-in-part of application Ser. No. 5,141, filed Jan. 22, 1970, and now abandoned.

BACKGROUND OF THE INVENTION

This invention relates to the preparation of polyethylene powders. In another aspect, this invention relates to the preparation of polyethylene powders by a high-pressure, free-radical initiated polymerization process conducted in the presence of a controlled concentration of water, specific dispersing agents, and the rapid venting of the polymerization zone reaction mixture.

Powdered polymers, and particularly powdered polyethylene, has recently become of considerable commercial importance. For example, powdered polyethylene has been employed in such applications as rotational molding, fluidized-bed coatings, spray coatings, and the like. Such polyethylene powders have conventionally been prepared by grinding the polymer or dissolving the polymer in hot solvent and rapidly cooling the solution to effect the precipitation of fine polymeric particles which can be recovered by filtration or evaporation.

Due to the expense involved in the operation of conventional processes for the preparation of polyethylene powder, it would obviously be of considerable commercial value to be able to recover powdered polyethylene directly from the polymerization reaction, particularly from a high-pressure, free-radical initiated polymerization process.

Conventional processes employed for the production of polyethylene powder are generally ineffective to obtain polyethylene powders having surface areas in excess of 0.6 square meter per gram. Therefore a process capable of preparing polyethylene powders having substantially higher surface areas than 1.0 square meter per gram and even in excess of 10.0 square meters per gram, would be highly desirable as such polyethylene powders would be more effective in particular commercial applications as named above and in other commercial areas such as in the preparation of various filters.

Accordingly, an object of our invention is to provide a polyethylene powder having a surface area in excess of 1.0 square meter per gram.

Another object of our invention is to provide a process for the preparation of polyethylene powders having surface areas in excess of 1.0 square meter per gram.

Other objects of our invention will be readily apparent to those skilled in the art from the following description and the appended claims.

SUMMARY OF THE INVENTION

Polyethylene powders containing absorbed water and having surface areas in excess of 1.0 square meter per gram are prepared by a high-pressure, free-radical initiated ethylene polymerization process conducted in the presence of water, a water-soluble initiator, a dispersing agent selected from the group consisting of polyvinyl alcohol and polyvinyl pyrrolidone, and by rapidly venting the polymerization zone or zone containing the polymerization effluent mixture so as to obtain a polyethylene free-flowing powder product containing adsorbed water and having a surface area in excess of 1.0 square meter per gram.

DESCRIPTION OF THE INVENTION

In preparing the polyethylene powders of this invention, ethylene can be introduced into a high-pressure reactor containing an aqueous solution of a water-soluble, free-radical polymerization initiator and a dispersing agent as hereinafter described, the ethylene polymerized therein, and the polymerization zone or zone containing the polymerization zone effluent mixture rapidly vented to provide a polyethylene powder containing adsorbed water and having a high surface area. Pressures employed in the polymerization reaction are superatmospheric, normally above 10,000 psig. Polymerization temperatures below the melting point of the product polyethylene are employed in the polymerization system. Normally, the polymerization temperature will be in the range of 60° to 90° C.

The polymerization initiator can be any conventional water-soluble, free-radical generating polymerization initiator conventionally employed in the polymerization of ethylene. Although water-soluble persulfate initiators such as sodium and potassium persulfates are preferred in the practice of the invention, it is not intended that the invention should be limited thereto as other water-soluble initiators such as hydrogen peroxide and initiators conventionally employed in redox polymerization systems can also be employed. The concentration of the initiator in the aqueous phase can be as low as about 0.05 percent by weight of the aqueous phase, although concentrations of the initiator in the range of 0.5 to 2 percent by weight of the aqueous phase are normally employed.

The aqueous phase can contain a pH adjuster, particularly in those instances where the water-soluble persulfate initiators are employed and it is desired to prevent the aqueous phase from becoming excessively acidic. A pH normally in the range of 5 to 8 is maintained in the aqueous phase. Alkaline substances which can suitably be employed in controlling the pH of the aqueous system include, for example, potassium phosphates, such as tripotassium phosphate and potassium carbonate, which substances are also buffers. To give the desired pH values, tripotassium phosphate, for example, can be added to the aqueous phase in amounts between about 0.25 and about 0.7 percent by weight of the aqueous phase.

In producing the high-surface polyethylene powders of this invention, a dispersing agent selected from the group consisting of polyvinyl alcohol and polyvinyl pyrrolidone is introduced into the polymerization reactor. Conveniently, the dispersing agent and the initiator can be introduced with the water passed to the polymerization reactor. The concentration of the dispersing agent employed is normally in the range of 0.1 to 5.0 percent by weight of the aqueous phase and preferably in the range of from about 0.5 to about 3.0 percent by weight.

The polymerization reaction is conducted in the presence of a controlled concentration of water with the polymerization process being either batch or continuous. Water is introduced into the polymerization reactor at a rate so that the weight ratio of water to ethylene in the polymerization reactor will be maintained in the range of 2:1 to 6:1. The polymerization residence time in the reactor is sufficient so as to maintain a reaction mixture containing from 20 to 35 weight percent polyethylene solids in the aqueous medium.

By closely controlling the concentration of water in the polymerization zone, employing specific initiator and dispersing agents, and by maintaining the polymerization temperature below the melt temperature of the polyethylene, a porous polyethylene bead containing adsorbed water is produced in the polymerization reactor. The polyethylene powders containing the adsorbed water, often in the range of 70 to 80 percent by weight of water, are obtained by rapidly venting the polymerization reactor in the case of batch polymerization processes or by rapidly venting the zone to which the effluent mixture is passed from the polymerization reactor as subsequently described.

By rapidly venting the polymerization reactor in the case of the batch polymerization process, ethylene monomer and water in the vapor phase is withdrawn from the polymerization zone at a rapid rate so as to obtain a residual product comprising polyethylene powders containing substantial concentrations of water.

In continuous polymerization processes, an effluent mixture is withdrawn from the bottom of, for example, a vertical reactor employing a valving mechanism whereby high pressures can be maintained in the polymerization reactor while substantially continuously withdrawing an effluent mixture containing the polyethylene powders. The effluent mixture is passed directly to a zone wherein rapid venting of the ethylene and water vapor is effected so as to obtain polyethylene powders containing substantial concentrations of adsorbed water, as in the case of the batch polymerization process.

The polyethylene powders recovered from the polymerization reactor contain a substantial quantity of adsorbed water, often in the range of 70 to 80 percent by weight. This moisture can be removed from the polyethylene powder by drying at a temperature below the melting point of the polyethylene or by vacuum drying the polyethylene powder at room temperatures. The polyethylene powder recovered from the polymerization reaction appears to be hydrophilic whereas the powder after drying exhibits characteristics which are hydrophobic. For, example, the hydrophobic characteristics of the polyethylene powder can be demonstrated by the ability of the polyethylene powder to keep an object onto which it has been coated dry when the object is immersed in water.

Another unique characteristic of the dried polyethylene powder is that when small drops of water are made to fall onto the powder, beads are formed in which each bead has a coating of the polyethylene powder. This coated bead acts much in the same manner as a droplet of mercury in that when it is placed on the surface of water it retains its dimensions.

The polyethylene powders are of relatively small particle size and have surface areas in the range of 1.0 to 15 square meters per gram and typically have surface areas in the range of 5.0 to 15 square meters per gram. The surface areas of the polyethylene powders can be determined by the BET test method as set forth by S. Brunauer, P. H. Emmett and E. Teller in the *Journal of American Chemical Society*, Volume 60, Page 309, 1938.

The polyethylene powders of this invention can be employed in rotational molding processes, fluidized-bed coatings, spray coatings, and the like. Additionally, such polyethylene powders of high surface areas have wide utility in a variety of filtering processes.

The following examples are presented to illustrate the objects and advantages of the invention. It is not intended, however, that the invention should be limited to the specific embodiments presented therein. The polyethylene powders of this invention can also be employed to reduce evaporation loss from bodies of water. When placed on water, the polyethylene powders spread out to form a thin film coating on the surface of the water.

EXAMPLE I

A 250 milliliter high-pressure reaction vessel was purged with ethylene to remove air from the system and heat was applied to bring the temperature of the reactor up to 77° C. A solution comprising 1 gram of trisodium phosphate and 0.1 gram of cold water-soluble polyvinyl alcohol in 98 milliliters of deionized water was added to the reactor through the addition port during pressurization to 8,000 psig. When the reactor had been warmed again to 77° C, 2 milliliters of a water solution containing 0.5 gram of ammonium persulfate were injected into the additive pot and passed into the reactor during pressurization to 12,500 psig, resulting in a rise in temperature in the reactor to 80° C. The pressure within the reactor dropped to 11,500 psig in 48 minutes and the reactor was repressurized to 12,500 psig. Twenty minutes later the pressure had again fallen to 11,500 psig and was returned to 12,500 psig. Another repressurization was made after 92 minutes and the final pressure was 12,000 psig after 100 minutes. The temperature rose from 80° to 85° C during the run. The reactor was then cooled and vented.

A free-flowing polyethylene powder was recovered from the reactor. The moisture content of the recovered powder was 78 percent by weight of the powder. The polyethylene polymer yield was 28 grams.

EXAMPLE II

The run of Example I was repeated using twice the quantity of ammonium persulfate with all other reaction ingredients and quantities held constant. As before, the reactor was purged and warmed to 77° C. The solutions were added during pressurization and the progress of the reaction was followed by pressure and temperature recordings. The rate of reaction was faster than that which occurred in Example I as determined by pressure drop although the temperature rise was negligible for the first 70 minutes. Repressurizations were made at intervals of 36 minutes, 21 minutes and 12 minutes to return the pressure to 12,500 psig after it had fallen to 11,500 psig. By repressuring, an average pressure of 12,000 psig was maintained throughout the reaction period. The temperature was held between 78° and 80° C until the last two minutes when the temperature rose 5° C and the reaction was terminated by rapidly venting and cooling the reactor. The total pressure drop was 3,500 psi for the 72 minute reaction period.

The yield of polyethylene powder was 32 grams. The polyethylene powder before drying was free-flowing and contained a moisture content of 79 weight percent. Analysis of the surface area of the polyethylene powders produced in this example by the BET test method previously described in the specification show that the polyethylene powders produced in this run have a surface area of 7 square meters per gram. Surface measurements on the powdered polyethylene of this run produced the following results:

| Pore Radium(M) | Percent of Total Area |
|---|---|
| 300–250 | 4.4 |
| 250–200 | 9.9 |
| 200–150 | 21.8 |
| 150–100 | 4.8 |
| 100–90 | 1.5 |
| 90–80 | 2.7 |
| 80–70 | 4.0 |
| 70–60 | 6.7 |
| 60–50 | 10.6 |
| 50–45 | 7.7 |
| 45–40 | 1.2 |
| 40–35 | 2.1 |
| 35–30 | 3.9 |
| 30–25 | 9.3 |
| 25–20 | 5.7 |
| 20–15 | 3.7 |
| | 100.0 |

EXAMPLE III

A 250 millileter high-pressure batch reactor was purged of air with an ethylene stream and pressure tested to 12,500 psig. The pressure was lowered to atmospheric pressure and the reactor temperature was stabilized at 77° C. An aqueous solution containing 1 gram of trisodium phosphate and 0.2 gram of polyvinyl pyrrolidone was injected through the addition port and swept into the reactor during pressurization to 12,500 psig. The pressure dropped 500 psi in 7.5 minutes and a repressurization from 11,500 to 12,500 psig was made after 27 minutes. The temperature during this time was 80° C. Following the repressurization, the temperature rose gradually to 82° C while the pressure dropped to 11,500 psig in 12 minutes. At this point, the reaction was terminated by cooling the reactor and venting the gas.

A polyethylene powder having a water content of 80 percent was recovered from the reactor. The yield of polyethylene powder was approximately 20 grams, based on the total weight of the product and moisture content measurements.

Although the invention has been described with reference to specific materials, embodiments and details, various modifications and changes, within the scope of this invention, will be apparent to those skilled in the art and are contemplated to be embraced in the invention.

What is claimed is:

1. A process for the manufacture of free-flowing polyethylene powders containing substantial concentrations of adsorbed water which consists essentially of introducing a water-soluble initiator and a dispersing agent selected from the group consisting of polyvinyl alcohol and polyvinyl pyrrolidone into a polymerization zone, introducing ethylene into said polymerization zone, introducing water into said polymerization zone at a rate so as to maintain a weight ratio of water to ethylene in said polymerization zone in the range of 2:1 to 6:1, maintaining a polymerization temperature in the range of 60° to 90°C. in said polymerization zone, maintaining a polymerization pressure above 10,000 psig in said polymerization zone, continuing the polymerization for a perid of time sufficient so that the formed polyethylene solids constitute about 20–35 percent by weight of the combined weight of polyethylene and water, venting the reaction mixture, and recovering polyethylene powders containing substantial concentrations of adsorbed water.

2. The process of claim 1 wherein said water-soluble initiator is a water-soluble persulfate and wherein the concentration of said initiator is in the range of 0.1 to 3.5 percent by weight of the water introduced in said polymerization zone.

3. The process of claim 2 wherein a pH in the range of 5 to 8 is maintained in the polymerization zone.

4. The process of claim 2 wherein the concentration of said dispersing agent introduced into said polymerization zone is in the range of from about 0.2 to 10 percent by weight of the water introduced into said polymerization zone.

5. The process of claim 1 wherein the polymerization reaction mixture is passed from the polymerization zone to a venting zone wherein rapid venting of the reaction mixture is effected, and polyethylene powders containing substantial concentrations of adsorbed water are recovered from the venting zone.

* * * * *